United States Patent
Tseng et al.

(10) Patent No.: US 8,094,275 B2
(45) Date of Patent: Jan. 10, 2012

(54) ACTIVE DEVICE ARRAY SUBSTRATE AND LIQUID CRYSTAL DISPLAY PANEL

(75) Inventors: Wen-Hsien Tseng, Taichung (TW); Yen-Heng Huang, Taipei County (TW); Chia-Hui Pai, Taichung (TW); Chung-Kai Chen, Taichung County (TW); Wei-Yuan Cheng, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 145 days.

(21) Appl. No.: 12/723,695

(22) Filed: Mar. 15, 2010

(65) Prior Publication Data

US 2011/0122345 A1    May 26, 2011

(30) Foreign Application Priority Data

Nov. 20, 2009    (TW) ................... 98139555 A

(51) Int. Cl.
*G02F 1/1337* (2006.01)

(52) U.S. Cl. ..................... 349/129; 349/106

(58) Field of Classification Search ......... 349/106–108, 349/129
See application file for complete search history.

(56) References Cited

U.S. PATENT DOCUMENTS

| 6,011,274 | A | 1/2000 | Gu et al. |
| 6,365,916 | B1 | 4/2002 | Zhong et al. |
| 6,707,067 | B2 | 3/2004 | Zhong et al. |
| 7,135,705 | B2 | 11/2006 | Zhong et al. |
| 7,145,622 | B2 | 12/2006 | Kataoka et al. |
| 2006/0192911 | A1 | 8/2006 | Ohmuro et al. |
| 2008/0143901 | A1* | 6/2008 | Kim .............................. 349/38 |
| 2009/0046233 | A1 | 2/2009 | Cho et al. |

FOREIGN PATENT DOCUMENTS

TW    I310104    5/2009

* cited by examiner

*Primary Examiner* — David Nelms
*Assistant Examiner* — Phu Vu
(74) *Attorney, Agent, or Firm* — Jianq Chyun IP Office

(57) ABSTRACT

An active device array substrate includes a substrate, scan and data lines defining pixel regions, active devices, pads, color filter layers, and pixel electrodes. The active devices respectively correspond to the pixel regions and electrically connect the corresponding scan lines and data lines. The pads disposed within the corresponding pixel regions connect the active devices. The color filter layers covering the pixel regions are disposed on the active devices and the pads. Each color filter layer has an opening exposing the corresponding pad and having a polygonal shape. The pixel electrodes are located on the color filter layers in the pixel regions. Each pixel electrode connects the pad downward via the corresponding opening and has parallel fine slits having a first extension direction. An included angle between the first extension direction and an extension direction of a first side of the opening is $\theta 1$, and $60° \leq \theta 1 \leq 90°$.

20 Claims, 6 Drawing Sheets

ACTIVE DEVICE ARRAY SUBSTRATE AND LIQUID CRYSTAL DISPLAY PANEL

CROSS-REFERENCE TO RELATED APPLICATION

This application claims the priority benefit of Taiwan application serial no. 98139555, filed on Nov. 20, 2009. The entirety of the above-mentioned patent application is hereby incorporated by reference herein and made a part of specification.

BACKGROUND OF THE INVENTION

1. Field of the Invention

The invention as described in the embodiments relates to an active device array substrate and a liquid crystal display (LCD) panel. More particularly, the invention as described in the embodiments relates to an active device array substrate having favorable liquid crystal alignment and an LCD panel.

2. Description of Related Art

With recent progress in display technology, displays facilitate our lives. Due to demands on light and thin displays, flat panel displays (FPDs) have now become mainstream display products. Among various FPDs, LCDs characterized by great space utilization, low power consumption, non-radiation, and low electromagnetic interference win popularity with consumers.

In a normal LCD, a color filter on array (COA) substrate and a black matrix on array (BOA) are the most commonly used active device array substrates. To fabricate the COA substrate or the BOA substrate, it is necessary to form openings on color filter layers or on light shielding layers for connecting pixel electrodes to thin film transistors or capacitance pads in a downward manner.

However, after the aforesaid COA substrate or the BOA substrate and an opposite substrate together form an LCD panel, liquid crystal molecules in a liquid crystal layer sandwiched between the opposite substrate and the COA substrate or the BOA substrate are affected by terrain around the openings, such that disclination (disordered alignment) of the liquid crystal molecules occurs and therefore results in reduction of image quality of the LCD panel.

SUMMARY OF THE INVENTION

The invention as described in the embodiments is directed to an active device array substrate which effectively prevents disclination of liquid crystal molecules.

The invention as described in the embodiments is further directed to an LCD panel featuring satisfactory liquid crystal alignment.

In an embodiment of the invention, an active device array substrate including a substrate, a plurality of scan lines parallel to one another and a plurality of data lines parallel to one another, a plurality of active devices, a plurality of pads, a plurality of color filter layers, and a plurality of pixel electrodes is provided. The scan lines and the data lines intersect and define a plurality of pixel regions on the substrate. The active devices are respectively disposed corresponding to the pixel regions and electrically connected to the corresponding scan lines and the corresponding data lines. The pads are respectively disposed within the corresponding pixel regions and connected to the active devices. The color filter layers respectively cover the pixel regions on the substrate and are disposed on the active devices and the pads. Each of the color filter layers has a first opening exposing the corresponding pad and having a polygonal shape. The pixel electrodes are respectively located on the color filter layers in the pixel regions. Each of the pixel electrodes passes through the first opening of the corresponding color filter layer and connects the corresponding pad in a downward manner. Besides, each of the pixel electrodes has a plurality of first fine slits. The first fine slits are parallel to one another and have a first extension direction. An included angle between the first extension direction and an extension direction of a first side of the first opening is $\theta 1$, and $60° \leq \theta 1 \leq 90°$.

According to an embodiment of the invention, in the active device array substrate, each of the pixel electrodes has a plurality of second fine slits, for example. The second fine slits have the same second extension direction. An included angle between the second extension direction and an extension direction of a second side of the first opening is $\theta 2$.

According to an embodiment of the invention, in the active device array substrate, $60° \leq \theta 2 \leq 90°$.

According to an embodiment of the invention, in the active device array substrate, each of the first openings is located at a center of the corresponding pixel electrode, for example.

According to an embodiment of the invention, in the active device array substrate, each of the pixel electrodes is divided into a plurality of regions, for example. Each of the regions has a group of fine slits parallel to one another. Each group of fine slits has an extension direction. Each of the pixel electrodes respectively corresponds to a side of the first opening in each of the regions, and an included angle between the extension direction of the group of fine slits and an extension direction of the corresponding side of the first opening is $\theta$.

According to an embodiment of the invention, in the active device array substrate, $60° \leq \theta \leq 90°$.

According to an embodiment of the invention, in the active device array substrate, each of the pixel electrodes is divided into four regions, and the first opening is parallelogram-shaped, for example.

According to an embodiment of the invention, in the active device array substrate, each of the pixel electrodes does not have fine slits around the corresponding first opening, for example.

According to an embodiment of the invention, in the active device array substrate, when an operational frequency is greater than 1000 Hz, a dielectric constant of the material of the color filter layers is less than 4.5, for example.

According to an embodiment of the invention, in the active device array substrate, an operational temperature of the material of the color filter layers ranges from −50° C. to 150° C., for example.

In an embodiment of the invention, an LCD panel including the aforesaid active device array substrate, an opposite substrate, and a liquid crystal layer is provided. The opposite substrate is disposed opposite to the active device array substrate. The liquid crystal layer is disposed between the active device array substrate and the opposite substrate.

According to an embodiment of the invention, in the LCD panel, a plurality of alignment structures are disposed at a side of the opposite substrate facing the active device array substrate, for example. The alignment structures respectively correspond to the first openings of the color filter layers.

According to an embodiment of the invention, in the LCD panel, the alignment structures are protrusions or openings, for example.

In an embodiment of the invention, an active device array substrate including a substrate, a plurality of scan lines parallel to one another and a plurality of data lines parallel to one another, a plurality of active devices, a plurality of light shielding layers, a plurality of color filter layers, and a plurality of pixel electrodes is provided. The scan lines and the data lines intersect and define a plurality of pixel regions on the substrate. The active devices are respectively disposed corresponding to the pixel regions and electrically connected to the corresponding scan lines and the corresponding data lines. The light shielding layers respectively surround the pixel regions and are located on the active devices. Each of the light shielding layers has a first opening and a second opening. The first opening exposes the corresponding active device. The second opening exposes the corresponding pixel region and has a first side adjacent to the first opening. The first side is a straight line. The color filter layers are respectively disposed in the pixel regions. The pixel electrodes are respectively located on the color filter layers and the corresponding light shielding layers. Each of the pixel electrodes passes through the first opening of the corresponding light shielding layer and connects the corresponding active device in a downward manner. Besides, each of the pixel electrodes has a plurality of first fine slits. The first fine slits are parallel to one another and have a first extension direction. An included angle between the first extension direction and an extension direction of the first side of the second opening is θ, and $60° \leq θ \leq 90°$.

According to an embodiment of the invention, in the active device array substrate, each of the first openings is located at a corner of the corresponding pixel region, for example.

According to an embodiment of the invention, in the active device array substrate, each of the pixel electrodes is divided into a plurality of regions, for example. Each of the pixel electrodes has a group of fine slits parallel to one another in each of the regions, and the first opening and the first side of the second opening are located in one of the regions.

Based on the above, the included angle between the extension direction of the fine slits on the pixel electrodes and the extension direction of the side of the opening (the opening allows the corresponding pixel electrode to connect the corresponding capacitance pad in a downward manner) ranges from 60° to 90°. Thereby, disclination of liquid crystal molecules in the liquid crystal layer does not occur around the opening, and the image quality of the LCD panel can be further improved.

Additionally, in this invention, each of the light shielding layers has the first opening exposing the corresponding active device and the second opening exposing the corresponding pixel region, and the included angle between the extension direction of the side of the second opening (the side of the second opening is adjacent to the first opening) and the extension direction of the fine slits on one of the pixel electrodes ranges from 60° to 90°. Hence, the liquid crystal molecules in the liquid crystal layer can be arranged well around the second opening, so as to improve the image quality of the LCD panel.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
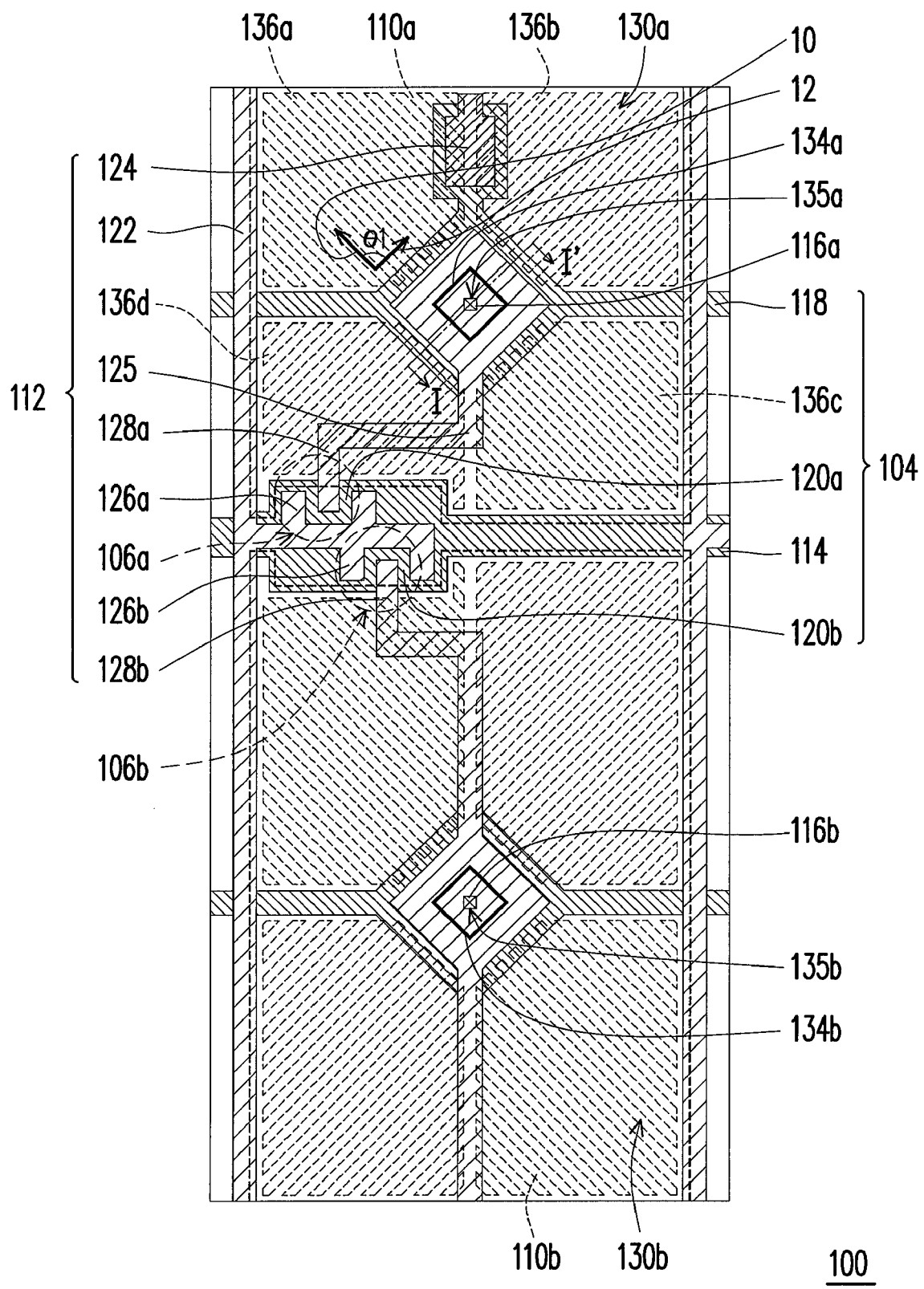
FIG. 1A is a schematic top view illustrating an active device array substrate according to a first embodiment of the invention.
Figure 1B:
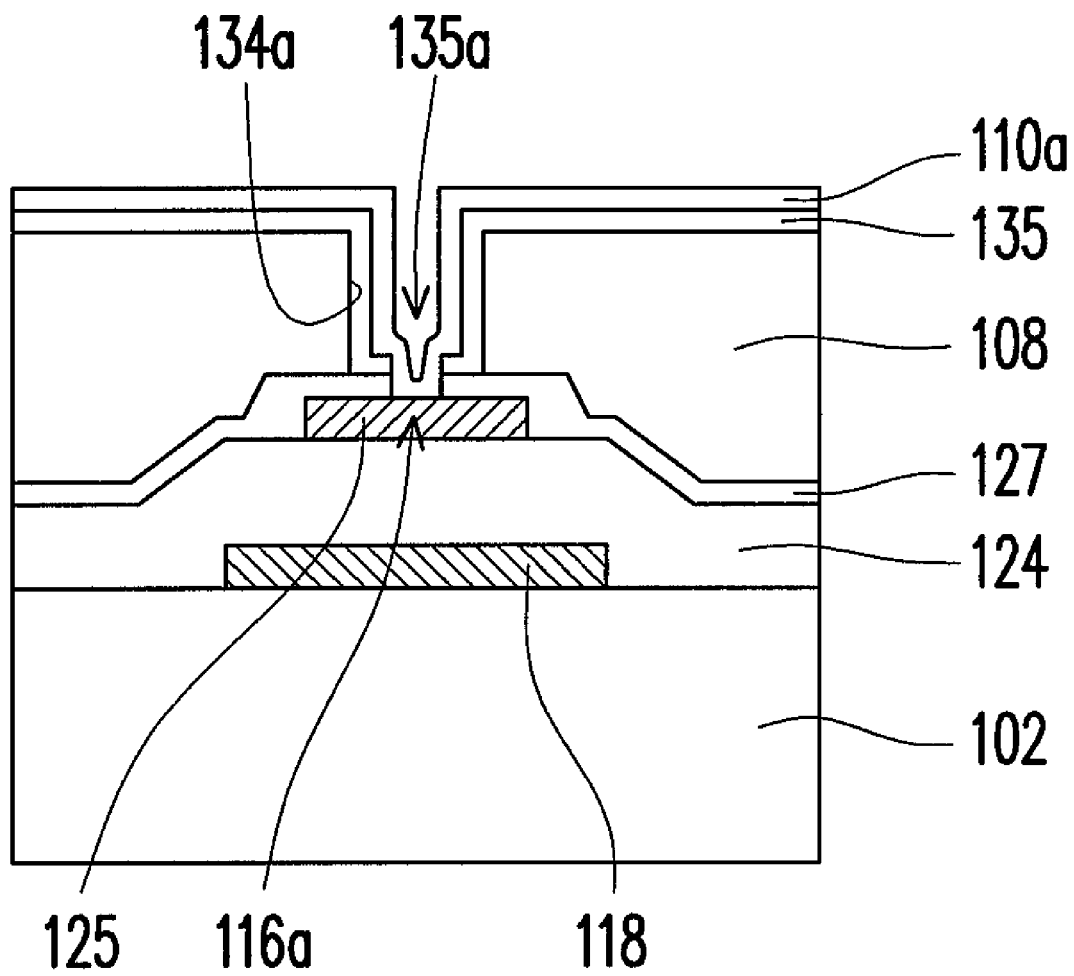
FIG. 1B is a schematic cross-sectional view taken along a section line I-I' depicted in FIG. 1A.

FIG. 1A is a schematic top view illustrating an active device array substrate according to a first embodiment of the invention. FIG. 1B is a schematic cross-sectional view taken along a section line I-I' depicted in FIG. 1A. In the embodiment, only one pixel region is depicted for the purpose of explanation. The pixel region has two pixel electrodes, and two active devices are correspondingly disposed. Certainly, based on actual design demands, one or more pixel electrodes can be disposed in the pixel region, and the number of the active devices is correspondingly decided.

To elaborate the invention with reference to FIGS. 1A and 1B with clarity, some film layers including a color filter layer 108, a dielectric layer 124, and a passivation layer 127 are omitted in FIG. 1A. The active device array substrate 100 includes a substrate 102, a patterned conductive layer 104, active devices 106a and 106b, a color filter layer 108, pixel electrodes 110a and 110b, and a patterned conductive layer 112. The patterned conductive layer 104 includes scan lines 114 parallel to one another, a conductive layer 118, and gate electrodes 120a and 120b of the active devices 106a and 106b. The patterned conductive layer 112 includes data lines 122 parallel to one another, conductive layers 124 and 125, source electrodes 126a and 126b of the active devices 106a and 106b, and drain electrodes 128a and 128b of the active devices 106a and 106b. The scan lines 114 and the data lines 122 intersect and define pixel regions 130a and 130b on the substrate 102. The active devices 106a and 106b respectively correspond to the pixel regions 130a and 130b and are electrically connected to the corresponding scan lines 114 and the corresponding data lines 122. Besides, the dielectric layer 124 is disposed on the substrate 102 to cover the patterned conductive layer 104. On the other hand, the passivation layer 127 is disposed on the dielectric layer 124 to cover the dielectric layer 124 and the patterned conductive layer 112. Detailed arrangement and materials of the substrate 102, the patterned conductive layers 104 and 112, the active devices 106a and 106b, the dielectric layer 124, and the passivation layer 127 are well known to people having ordinary skill in the art, and the arrangement of these layers and devices is not limited to that depicted in the drawings. No further descriptions of these devices and layers are given herein.

The color filter layer 108 covers the pixel regions 130a and 130b and is located above the active devices 106a and 106b and pads 116a and 116b. The pads 116a and 116b refer to connecting portions between the conductive layer 125 and the pixel electrodes 110a and 110b. In other words, the pixel electrodes 110a and 110b are connected to the active devices 106a and 106b via the pads 116a and 116b, respectively. Additionally, as for a material of the color filter layer 108, it should be mentioned that the required dielectric constant of the color filter layer 108 is varied together with different operational frequencies that are assigned. Normally, the operational frequencies of most LCD panels are greater than 1000 Hz, and hence the material of the color filter layer 108 in this invention can be chosen from any proper material as long as the material complies with the requirement that the dielectric constant is less than 4.5 when the operational frequency is greater than 1000 Hz. Besides, an operational temperature of the material of the color filter layer 108 ranges from −50° C. to 150° C., for example.

In the pixel regions 130a and 130b, the color filter layer 108 has openings 134a and 134b individually exposing the underlying passivation layer 127. What is more, in the pixel regions 130a and 130b, the exposed passivation layer 127 has openings 135a and 135b respectively exposing a portion of the conductive layer 125. The portion of the conductive layer 125 exposed by the opening 135a is the pad 116a. The portion of the conductive layer 125 exposed by the opening 135b is the pad 116b. The openings 134a and 134b have a polygonal shape. According to this embodiment, the openings 134a and 134b are parallelogram-shaped, for example. The pixel electrode 110a is located on the color filter layer 108 in the pixel region 130a. Besides, the pixel electrode 110a passes through the opening 134a of the color filter layer 108 and the opening 135a of the passivation layer 127 and connects the pad 116a in a downward manner, so as to connect the drain electrode 128a of the active device 106a. The pixel electrode 110b is located on the color filter layer 108 in the pixel region 130b. Besides, the pixel electrode 110b passes through the opening 134b of the color filter layer 108 and the opening 135b of the passivation layer 127 and connects the pad 116b in a downward manner, so as to connect the drain electrode 128b of the active device 106b. In this embodiment, the openings 134a and 134b are respectively located at the center of the pixel electrodes 110a and 110b. Certainly, in other embodiments, the openings 134a and 134b can also be properly located elsewhere. Moreover, a passivation layer 135 is located between the pixel electrode 110a and the color filter layer 108 and between the pixel electrode 110b and the color filter layer 108. A material of the passivation layer 135 is the same as the material of the passivation layer 127, for example.

According to this embodiment, the pixel electrodes 110a and 110b respectively have four groups of fine slits 136a, 136b, 136c, and 136d. The fine slits in each group are parallel to one another, and an extension direction of the fine slits and an extension direction of a side of the opening 134a or a side of the opening 134b together form an included angle ranging from 60° to 90°. For instance, in this embodiment, an extension direction 10 of the fine slits 136a and an extension direction 12 of a side of the opening 134a together form an included angle θ1 equal to 90°. The extension directions of the fine slits 136a, 136b, 136c, and 136d and an extension direction of a side of the opening 134a or a side of the opening 134b respectively form included angles ranging from 60° to 90°. Hence, after the active device array substrate 100 and an opposite substrate are combined to form an LCD panel, disclination of liquid crystal molecules in a liquid crystal layer sandwiched between the active device array substrate 100 and the opposite substrate does not occur around the openings 134a and 134b. Thereby, the liquid crystal molecules can be arranged well, and image quality of the LCD panel can be further enhanced. Particularly, the included angle θ1 is 90° in this embodiment, which ensures satisfactory arrangement of the liquid crystal molecules and favorable image quality of the LCD panel.

In this embodiment, note that the pixel electrodes 110a and 110b are both divided into four regions, respectively, and each of the regions has one group of fine slits parallel to one another. By contrast, in other embodiments, the pixel electrodes can also be divided into two regions, three regions, or more regions, and each of the regions has one group of fine slits parallel to one another. In an alternative, each of the pixel electrodes can also be located in only one region, and the region has at least one group of fine slits parallel to one another. The extension direction of the fine slits and the extension direction of the side of the corresponding opening together form the included angle ranging from 60° to 90°.

Second Embodiment

Figure 2:
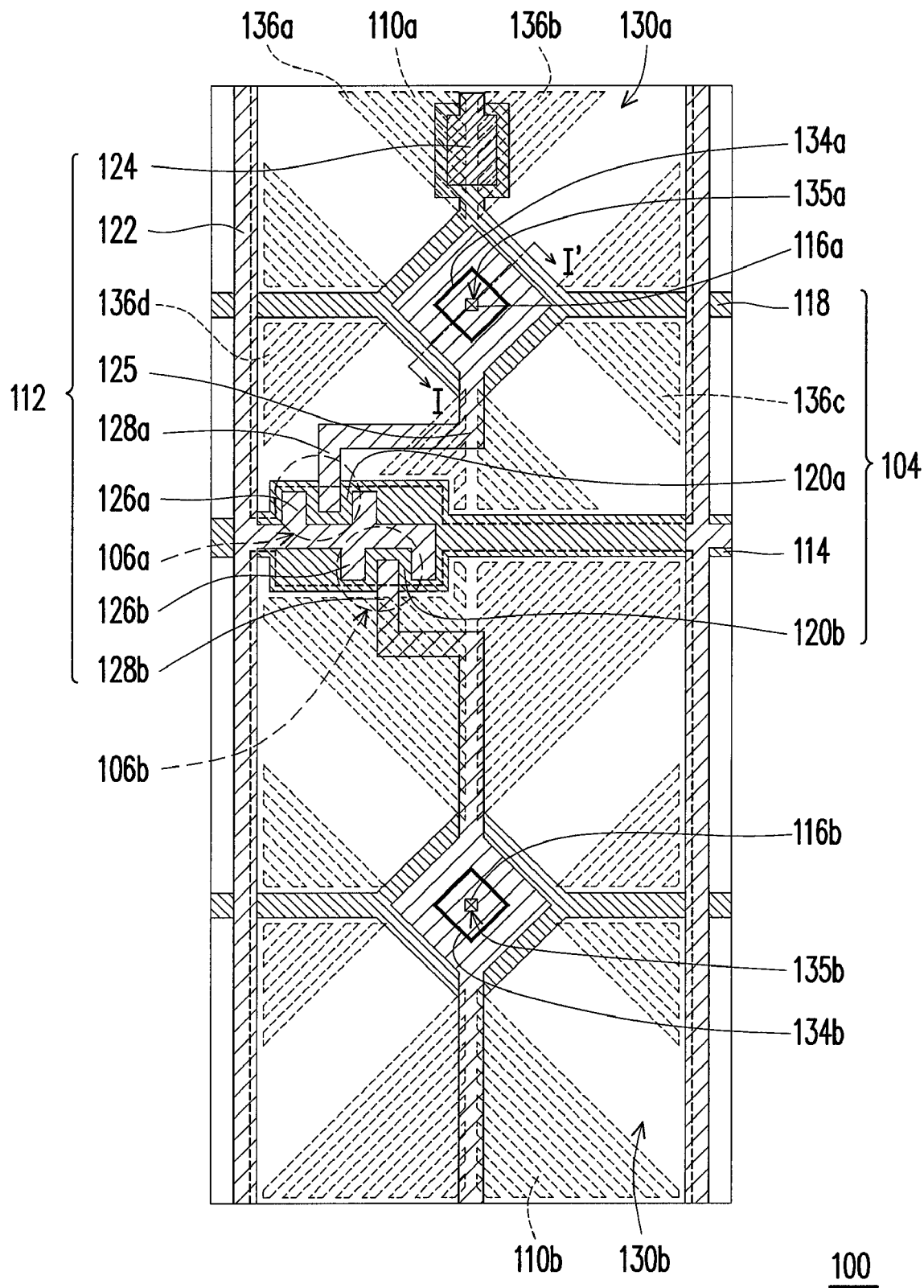
FIG. 2 is a schematic top view illustrating an active device array substrate according to a second embodiment of the invention.

In view of the fact that the terrain around the openings of the color filter layer gives rise to sufficient alignment of the liquid crystal molecules, the fine slits around the openings of the color filter layer can be omitted in this embodiment. That is to say, it is not necessary to form the fine slits around the openings in the pixel electrodes according to this embodiment, and light emitting efficiency of the display panel can be further improved. FIG. 2 is a schematic top view illustrating an active device array substrate according to this embodiment of the invention. As shown in FIG. 2, pixel electrodes 110a' and 110b' do not have fine slits around the openings 134a and 134b.

Third Embodiment

Figure 3:
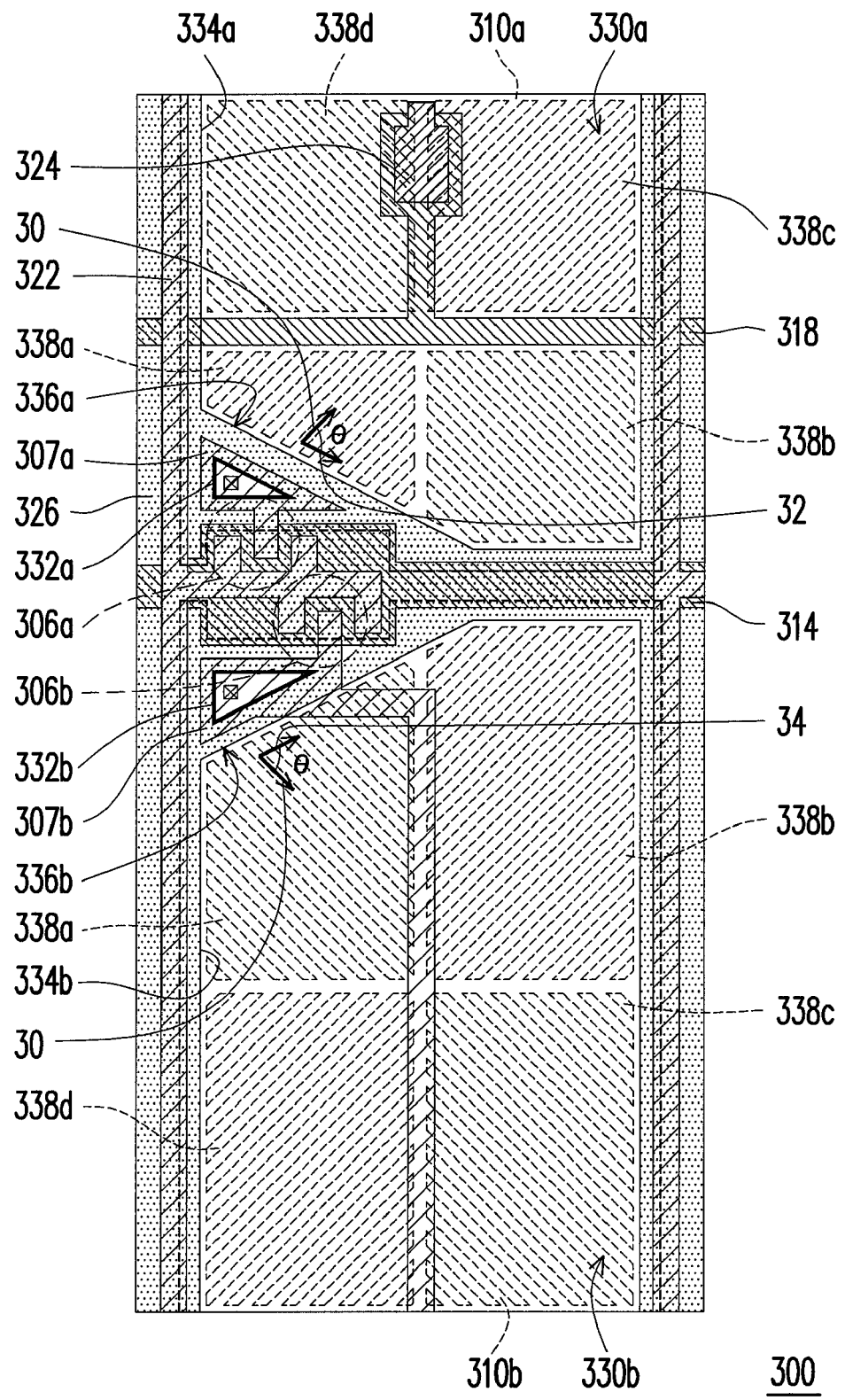
FIG. 3 is a schematic top view illustrating an active device array substrate according to a third embodiment of the invention.

FIG. 3 is a schematic top view illustrating an active device array substrate according to a third embodiment of the invention. In the embodiment, only one pixel region is depicted for the purpose of explanation. The pixel region has two pixel electrodes, and two active devices are correspondingly disposed. Certainly, based on actual design demands, one or more pixel electrodes can be disposed in the pixel region, and the number of the active devices is correspondingly decided, which should not be construed as limited to the embodiments set forth herein.

Besides, based on the same principle described in the first embodiment, extension directions of fine slits on pixel electrodes and extension directions of sides of openings exposing pixel regions in light shielding layers together form included angles ranging from 60° to 90° in this embodiment. Thereby, after an active device array substrate and an opposite substrate are combined to form an LCD panel, liquid crystal molecules in a liquid crystal layer sandwiched between the active device array substrate and the opposite substrate can be well arranged around the openings, so as to improve the image quality of the LCD panel.

In FIG. 3, the active device array substrate 300 includes a substrate (not shown), scan lines 314, a conductive layer 318, active devices 306a and 306b, a color filter layer, pixel electrodes 310a and 310b, data lines 322, a conductive layer 324, and a light shielding layer 326. Likewise, to elaborate the invention with reference to FIG. 3 with clarity, some film layers including the color filter layer, the dielectric layer, and the passivation layer are omitted in FIG. 3. In addition, according to this embodiment, the substrate, the scan lines 314, the conductive layer 318, the active devices 306a and 306b, the data lines 322, and the conductive layer 324 are similar to the substrate 102, the scan lines 114, the conductive layer 118, the active devices 106a and 106b, the data lines 122, and the conductive layer 124 described in the first embodiment. Furthermore, the color filter layer herein is formed by performing an inkjet printing process, which is well known to people having ordinary skill in the art and is therefore not further described hereinafter.

The light shielding layer 326 surrounds the pixel regions 330a and 330b defined by the scan lines 314 and the data lines 322 and is located on the active devices 306a and 306b. Besides, the light shielding layer 326 has openings 332a and 332b and openings 334a and 334b. The openings 332a and 332b are respectively located at a corner of the pixel regions 330a and 330b, for example, and the openings 332a and 332b respectively expose a portion of the active devices 306a and 306b, i.e. a portion of a drain electrode of the active device 306a and a portion of a drain electrode of the active device 306b according to this embodiment. The openings 334a and 334b respectively expose the pixel regions 330a and 330b and have sides 336a and 336b around the openings 332a and 332b. The sides 336a and 336b are both straight lines. The color filter layer is respectively disposed in the pixel regions 330a and 330b. In this embodiment, a material of the color filter layer is the same as the material of the color filter layer described in the first embodiment, and therefore no further description is provided herein. The pixel electrodes 310a and 310b are located on the color filter layer and the corresponding light shielding layer 326. The pixel electrode 310a passes through the opening 332a of the light shielding layer 326 and connects a drain electrode 307a of the active device 306a in a downward manner, while the pixel electrode 310b passes through the opening 332b of the light shielding layer 326 and connects a drain electrode 307b of the active device 306b in a downward manner. Besides, as described in the first embodiment, the pixel electrodes 310a and 310b of this embodiment are both divided into four regions, respectively, and each of the regions has one group of fine slits 338a, 338b, 338c, and 338d parallel to one another. In a region around the openings 332a and 332b, an extension direction of the fine slits and an extension direction of a side 336a of the opening 334a or a side 336b of the opening 334b respectively form an included angle ranging from 60° to 90°. For instance, in FIG. 3, where the fine slits 338a are located is around the openings 332a and 332b. Hence, an extension direction 30 of the fine slits 338a and an extension direction 32 of the side 336a of the opening 334a or an extension direction 34 of the side 336b of the opening 334b respectively form an included angle θ equal to 90°. Particularly, when the included angle θ is 90°, satisfactory arrangement of the liquid crystal molecules and favorable image quality of the LCD panel can be ensured.

According to this embodiment, the extension direction 30 of the fine slits 338a and the extension direction 32 of the side 336a of the opening 334a or the extension direction 34 of the side 336b of the opening 334b respectively form the included angle ranging from 60° to 90°. Hence, after an active device array substrate and an opposite substrate are combined to form an LCD panel, liquid crystal molecules in a liquid crystal layer sandwiched between the active device array substrate and the opposite substrate can be well arranged around the openings 334a and 334b, so as to improve the image quality of the LCD panel.

Additionally, similar to the first embodiment, this embodiment discloses that the pixel electrodes are respectively divided into four regions, and each of the regions has one group of fine slits parallel to one another. By contrast, in other embodiments, the pixel electrodes can also be divided into two regions, three regions, or more regions, and each of the regions has one group of fine slits parallel to one another. In an alternative, each of the pixel electrodes can also be located in only one region, and the region has at least one group of fine slits parallel to one another. In the region around the openings 332a and 332b, the extension direction of the fine slits and the extension direction of the side of the opening 334a or the side of the opening 334b respectively form the included angle ranging from 60° to 90.

Similarly, as described in the second embodiment, when the terrain around the openings 334a and 334b does not result in disclination of liquid crystal molecules and does not affect the arrangement of the liquid crystal molecules, the pixel electrodes 310a and 310b can have no fine slits around the openings 332a and 332b.

An LCD panel utilizing the active device array substrate 100 of the first embodiment is exemplarily described below. Certainly, the active device array substrate 100 of the first embodiment can also be replaced by other active device array substrates described in other embodiments.

Figure 4:
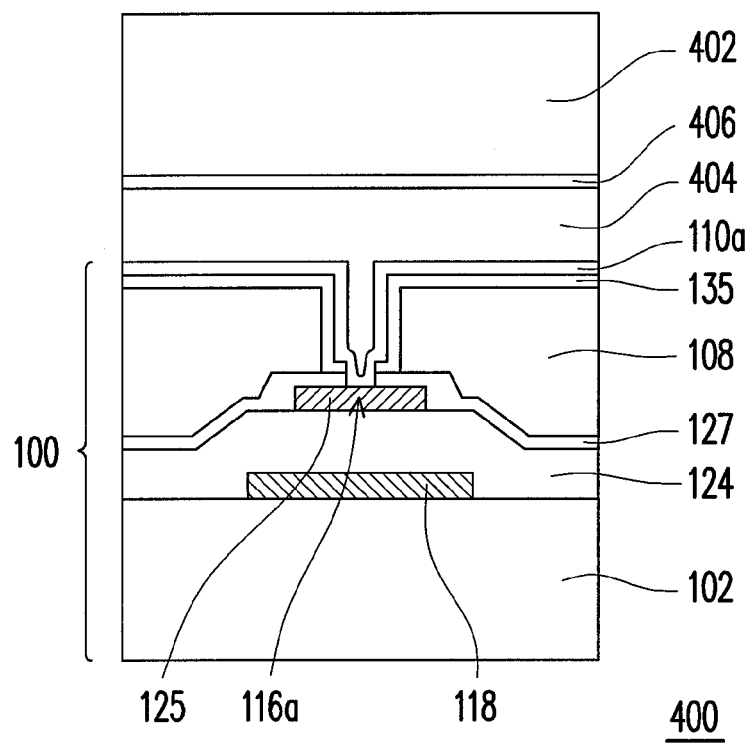
FIG. 4 is a schematic cross-sectional view illustrating an LCD panel according to an embodiment of the invention.

FIG. 4 is a schematic cross-sectional view illustrating an LCD panel according to an embodiment of the invention. As shown in FIG. 4, the LCD panel 400 includes the active device array substrate 100, an opposite substrate 402, and a liquid crystal layer 404. An electrode 406 is disposed on the opposite substrate 402. The opposite substrate 402 is disposed opposite to the active device array substrate 100. The liquid crystal layer 404 is disposed between the active device array substrate 100 and the opposite substrate 402.

Figure 5:
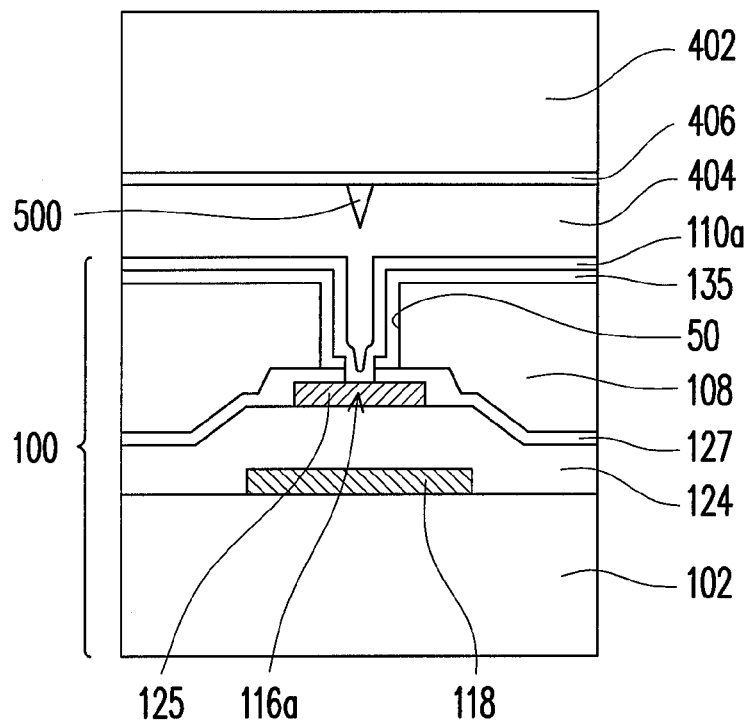
FIG. 5 is a schematic cross-sectional view illustrating an LCD panel according to another embodiment of the invention.

Besides, as indicated in FIG. 5, the opposite substrate of the LCD panel can also have an alignment structure 500 located at a side of the opposite substrate facing the active device array substrate 100 according to another embodiment. The alignment structure 500 corresponds to an opening 50 (e.g. the openings 134a, 134b, 135a, 135b, 332a, 332b, 334a, and 334b described in the above embodiments) of the color filter layer 108, so as to align the liquid crystal molecules and equip the LCD panel with favorable image quality. In FIG. 5, the alignment structure 500 is a protrusion which has a corn shape or any other proper shape.

Figure 6:
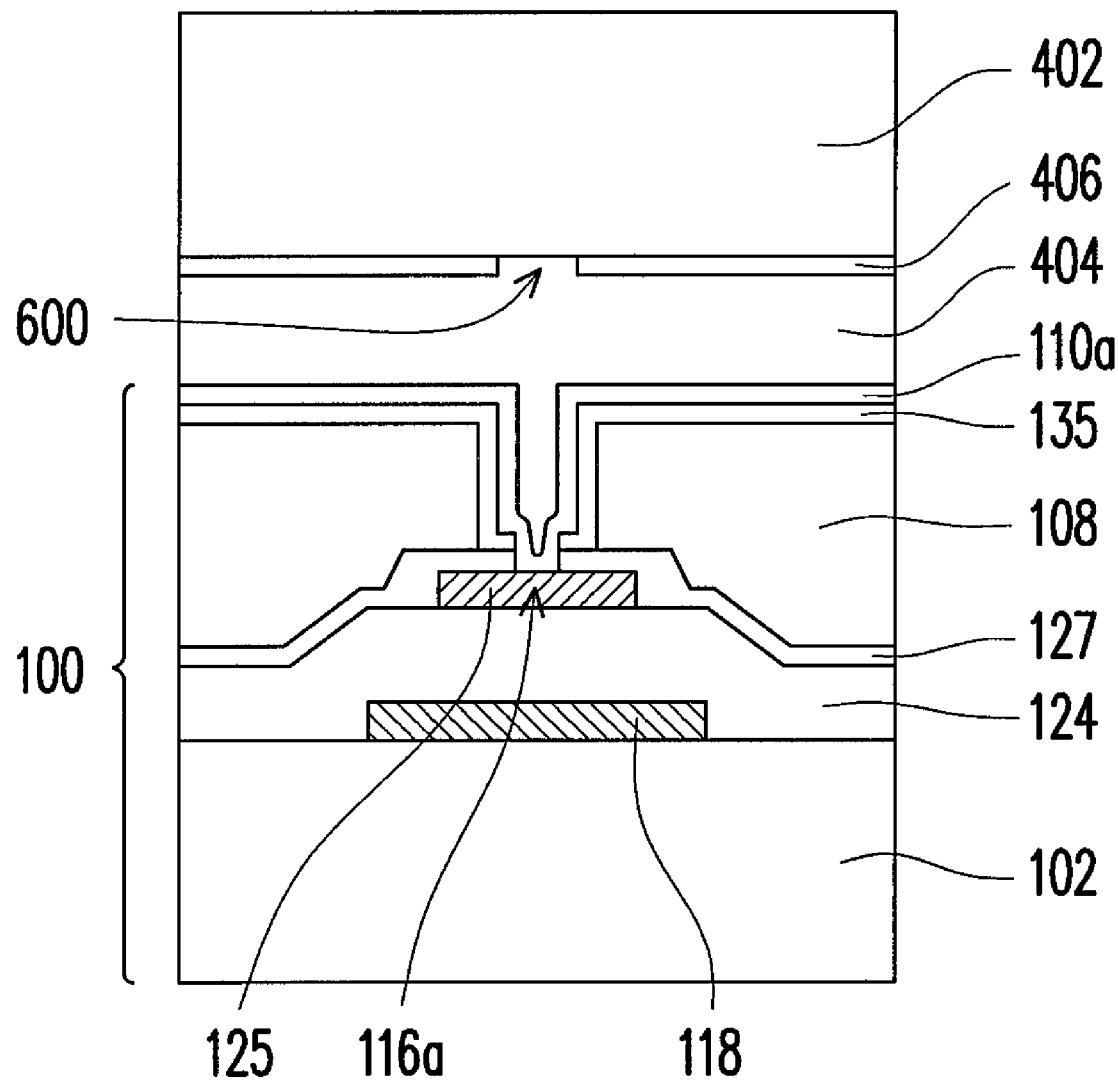
FIG. 6 is a schematic cross-sectional view illustrating an LCD panel according to still another embodiment of the invention.

In addition, as indicated in FIG. 6, the alignment structure can also be an opening 600 located in the electrode 406 according to still another embodiment. The opening 600 is, for example, a circular opening, a polygonal opening, or an opening having any other proper shape. Preferably, the shape of the opening 600 is the same as the shapes of the corresponding openings 134a, 134b, 135a, 135b, 332a, 332b, 334a, and 334b.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An active device array substrate comprising:
   a substrate;
   a plurality of scan lines parallel to one another and a plurality of data lines parallel to one another, the scan lines and the data lines intersecting and defining a plurality of pixel regions on the substrate;
   a plurality of active devices respectively corresponding to the pixel regions and electrically connected to the corresponding scan lines and the corresponding data lines;
   a plurality of pads, each of the pads being respectively disposed within the corresponding pixel region and connected to the corresponding active device;

a plurality of color filter layers respectively covering the pixel regions of the substrate and located on the active devices and the pads, each of the color filter layers having a first opening, the first opening exposing the corresponding pad and having a polygonal shape; and a plurality of pixel electrodes respectively located on the color filter layers in the pixel regions, each of the pixel electrodes passing through the first opening of the corresponding color filter layer and connecting the corresponding pad in a downward manner, each of the pixel electrodes having a plurality of first fine slits, the first fine slits being parallel to one another and having a first extension direction, wherein an included angle between the first extension direction and an extension direction of a first side of the first opening is $\theta 1$, and $60° \leqq \theta 1 \leqq 90°$.

2. The active device array substrate as claimed in claim 1, wherein each of the pixel electrodes has a plurality of second fine slits, the second fine slits have the same second extension direction, and an included angle between the second extension direction and an extension direction of a second side of the first opening is $\theta 2$.

3. The active device array substrate as claimed in claim 2, wherein $60° \leqq \theta 2 \leqq 90°$.

4. The active device array substrate as claimed in claim 1, wherein each of the first openings is located at a center of the corresponding pixel electrode.

5. The active device array substrate as claimed in claim 1, wherein each of the pixel electrodes is divided into a plurality of regions, each of the regions has a group of fine slits parallel to one another and having an extension direction, each of the pixel electrodes respectively corresponds to a side of the first opening in each of the regions, and an included angle between the extension direction of the group of fine slits and an extension direction of the corresponding side of the first opening is $\theta$.

6. The active device array substrate as claimed in claim 5, wherein $60° \leqq \theta \leqq 90°$.

7. The active device array substrate as claimed in claim 5, wherein each of the pixel electrodes is divided into four regions, and the first opening is parallelogram-shaped.

8. The active device array substrate as claimed in claim 1, wherein each of the pixel electrodes does not have fine slits around the corresponding first opening.

9. The active device array substrate as claimed in claim 1, wherein when an operational frequency is greater than 1000 Hz, the dielectric constant of the material of the color filter layers is less than 4.5.

10. The active device array substrate as claimed in claim 9, wherein an operational temperature of the material of the color filter layers ranges from −50° C. to 150° C.

11. A liquid crystal display panel comprising:
the active device array substrate as claimed in claim 1;
an opposite substrate disposed opposite to the active device array substrate; and
a liquid crystal layer disposed between the active device array substrate and the opposite substrate.

12. The liquid crystal display panel as claimed in claim 11, a plurality of alignment structures being disposed at a side of the opposite substrate facing the active device array substrate, the alignment structures respectively corresponding to the first openings of the color filter layers.

13. The liquid crystal display panel as claimed in claim 12, wherein the alignment structures comprise protrusions or openings.

14. An active device array substrate comprising:
a substrate;
a plurality of scan lines parallel to one another and a plurality of data lines parallel to one another, the scan lines and the data lines intersecting and defining a plurality of pixel regions on the substrate;
a plurality of active devices respectively corresponding to the pixel regions and electrically connected to the corresponding scan lines and the corresponding data lines;
a plurality of light shielding layers respectively surrounding the pixel regions and located on the active devices, each of the light shielding layers having a first opening and a second opening, the first opening exposing the corresponding active device, the second opening exposing the corresponding pixel region and having a first side adjacent to the first opening, the first side being a straight line;
a plurality of color filter layers respectively disposed in the pixel regions; and
a plurality of pixel electrodes respectively located on the color filter layers and the corresponding light shielding layers, each of the pixel electrodes passing through the first opening of the corresponding light shielding layer and connecting the corresponding active device in a downward manner, each of the pixel electrodes having a plurality of first fine slits, the first fine slits being parallel to one another and having a first extension direction, wherein an included angle between the first extension direction and an extension direction of the first side of the second opening is $\theta$, and $60° \leqq \theta \leqq 90°$.

15. The active device array substrate as claimed in claim 14, wherein each of the first openings is located at a corner of the corresponding pixel region.

16. The active device array substrate as claimed in claim 14, wherein each of the pixel electrodes is divided into a plurality of regions, each of the pixel electrodes has a group of fine slits parallel to one another in each of the regions, and the first opening and the first side of the second opening are located in one of the regions.

17. The active device array substrate as claimed in claim 16, wherein each of the pixel electrodes is divided into four regions.

18. The active device array substrate as claimed in claim 14, wherein when an operational frequency is greater than 1000 Hz, the dielectric constant of the material of the light shielding layers is less than 4.5.

19. The active device array substrate as claimed in claim 18, wherein an operational temperature of the material of the light shielding layers ranges from −50° C. to 150° C.

20. A liquid crystal display panel comprising:
the active device array substrate as claimed in claim 14;
an opposite substrate disposed opposite to the active device array substrate; and
a liquid crystal layer disposed between the active device array substrate and the opposite substrate.

* * * * *